US012509917B2

(12) United States Patent
Cornett-Ching

(10) Patent No.: US 12,509,917 B2
(45) Date of Patent: Dec. 30, 2025

(54) ASSEMBLY FOR RELOCATING ACTIVATION POINT FOR OPENING LATCH

(71) Applicant: John Henry Cornett-Ching, Okotoks (CA)

(72) Inventor: John Henry Cornett-Ching, Okotoks (CA)

( * ) Notice: Subject to any disclaimer, the term of this patent is extended or adjusted under 35 U.S.C. 154(b) by 156 days.

(21) Appl. No.: 18/257,471

(22) PCT Filed: Oct. 21, 2021

(86) PCT No.: PCT/CA2021/051479

§ 371 (c)(1),
(2) Date: Jun. 14, 2023

(87) PCT Pub. No.: WO2022/133578

PCT Pub. Date: Jun. 30, 2022

(65) Prior Publication Data

US 2024/0035311 A1 Feb. 1, 2024

Related U.S. Application Data

(60) Provisional application No. 63/130,081, filed on Dec. 23, 2020.

(51) Int. Cl.

| | |
|---|---|
| ***E05B 65/00*** | (2006.01) |
| ***E05B 15/00*** | (2006.01) |
| ***E05B 53/00*** | (2006.01) |
| ***E05C 3/00*** | (2006.01) |
| ***E05C 3/16*** | (2006.01) |
| ***E05C 3/24*** | (2006.01) |

(52) U.S. Cl.
CPC ...... *E05B 65/0007* (2013.01); *E05B 15/0093* (2013.01); *E05B 53/001* (2013.01); *E05C 3/006* (2013.01); *E05C 3/162* (2013.01); *E05C 3/24* (2013.01)

(58) Field of Classification Search
CPC ............. E05B 65/0007; E05B 15/0093; E05B 53/001; E05C 3/006; E05C 3/162; E05C 3/24
See application file for complete search history.

(56) References Cited

U.S. PATENT DOCUMENTS

| | | | | |
|---|---|---|---|---|
| 1,324,428 A | | 12/1919 | Mair | |
| 4,142,749 A | * | 3/1979 | Heald | E05B 65/0007 292/130 |
| 5,358,292 A | * | 10/1994 | Van Wiebe | E05C 3/30 292/225 |
| 7,021,678 B1 | * | 4/2006 | Raoult | A01K 1/0017 292/341.15 |

(Continued)

FOREIGN PATENT DOCUMENTS

| | | |
|---|---|---|
| GB | 347958 A | 5/1931 |

*Primary Examiner* — Mark A Williams
(74) *Attorney, Agent, or Firm* — Adrian D. Battison; Ade & Company Inc.; Ryan W. Dupuis

(57) ABSTRACT

A system for opening a latch on a barrier comprises an activator configured for receiving user-input, which is arranged at a different height on the barrier than the latch, and a striker configured for selectively engaging the latch responsive to the activator, so as to open the latch. The activator and striker are distinct, linearly displaceable members which are distinct from the latch and interact by camming engagement.

2 Claims, 4 Drawing Sheets

(56) References Cited

U.S. PATENT DOCUMENTS

| | | | | |
|---|---|---|---|---|
| 8,376,421 | B2 * | 2/2013 | Simmonds | E05B 15/101 292/DIG. 29 |
| 8,764,076 | B2 | 7/2014 | Glover | |
| 9,303,435 | B2 * | 4/2016 | Simmonds | E05C 1/08 |
| 10,358,849 | B2 | 7/2019 | Glover | |
| 10,662,686 | B2 * | 5/2020 | Schneider | E05B 65/0007 |
| 11,781,341 | B1 * | 10/2023 | Timothy | E05B 17/2034 292/69 |
| 12,104,410 | B2 * | 10/2024 | Weber | E05B 65/0007 |
| 2014/0353987 | A1 | 12/2014 | Glover | |
| 2016/0376820 | A1 * | 12/2016 | Glover | E05B 17/10 292/235 |
| 2017/0145715 | A1 * | 5/2017 | Timothy | E05B 65/0007 |
| 2017/0152682 | A1 * | 6/2017 | Mizner | E05B 65/0007 |
| 2018/0238084 | A1 * | 8/2018 | Weber | E05B 53/003 |
| 2020/0378158 | A1 * | 12/2020 | Weber | E05B 53/00 |

* cited by examiner

FIG. 8B
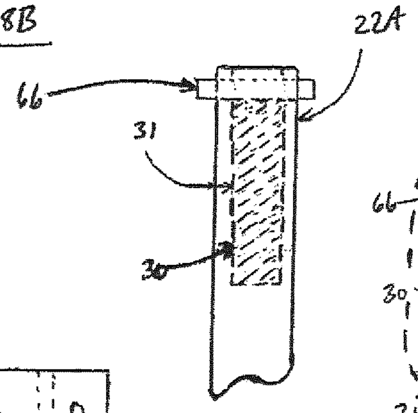
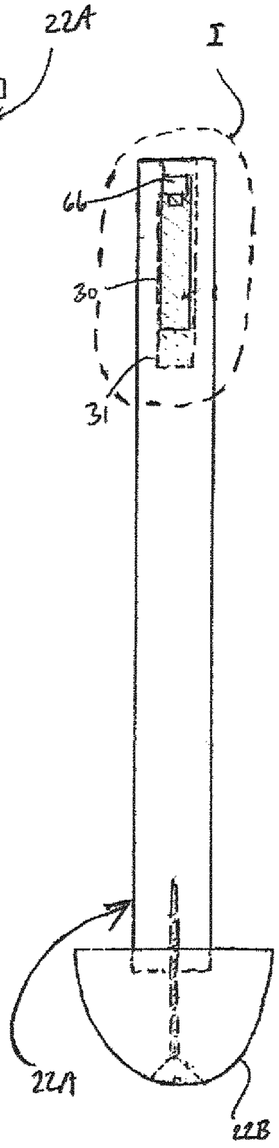
FIG. 8A
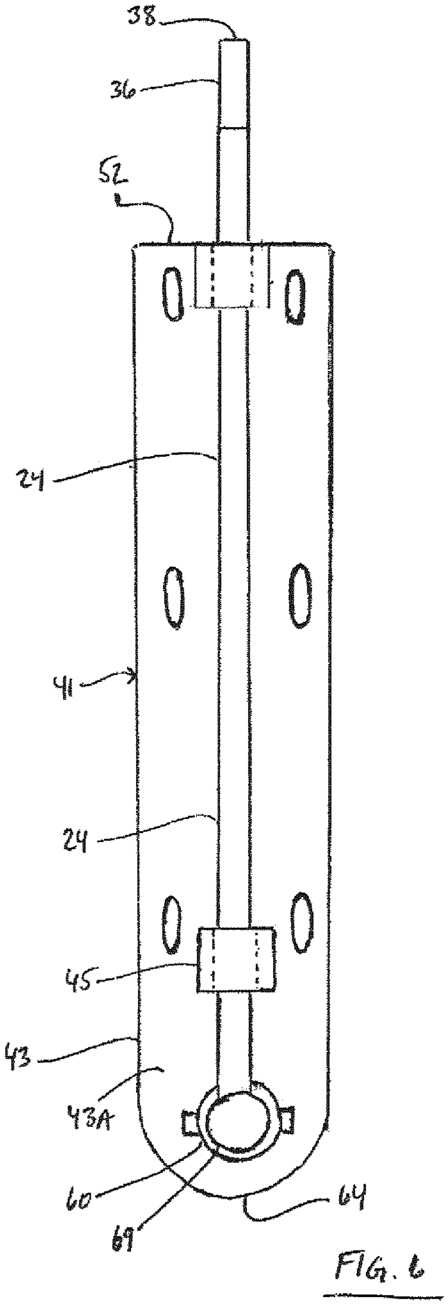
FIG. 6
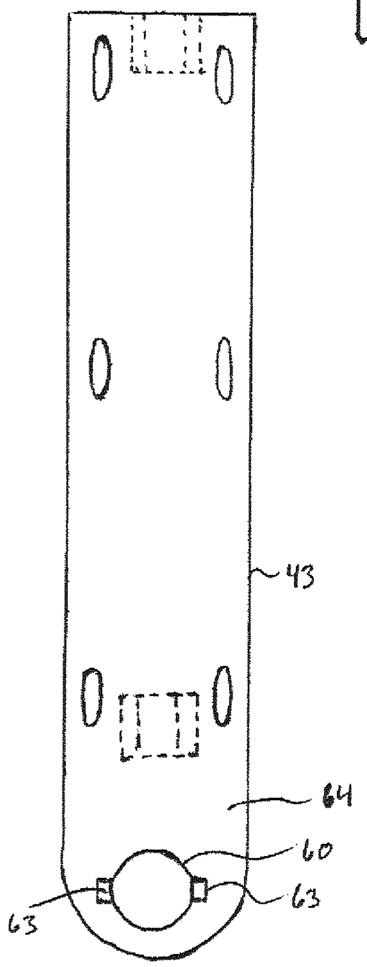
FIG. 7

ASSEMBLY FOR RELOCATING ACTIVATION POINT FOR OPENING LATCH

This application is a national phase filing of PCT/CA2021/051479 and claims priority from U.S. Provisional Application Ser. No. 63/130,081 filed Dec. 23, 2020.

FIELD OF THE INVENTION

The present invention relates generally to a system, assembly or mechanism for activating or opening a latch such as for a gate or other barrier, and more particularly to such a system, assembly or mechanism comprising an activator distinct from the latch and a striker responsive to the activator for positioning the latch in an open or releasing position in which the barrier is free to open.

BACKGROUND

There exist a plethora of systems, assemblies or mechanisms which interact with a latch used to retain a keeper on a movable barrier, in order to position the latch in an open or releasing position in which the keeper is released so that the barrier is free to open. However, prior art systems are substantially coincident in location with the latch relative to a support member such as an upstanding post on which the latch is mounted.

Typically, and quite purposefully, latches, especially on barriers such as fence gates, are mounted at significant heights to restrict access thereto by individuals standing on the ground.

SUMMARY OF THE INVENTION

According to an aspect of the invention there is provided a system for opening a latch on a barrier comprising:
- an activator configured for receiving user-input;
- wherein the activator is arranged at a different height on the barrier than the latch; and
- a striker configured for selectively engaging the latch responsive to the activator, so as to open the latch.

This arrangement permits for the relocation of an activation point, that is a location relative to the latch or barrier where the latch is actuated to be opened to release a keeper of a gate selectively closing a passageway in the barrier, to a different height, usually a lower height, than the latch.

In the illustrated arrangement, the activator is a mechanical actuator displaceable along a substantially-horizontal axis.

In the illustrated arrangement, the striker is a mechanical actuator displaceable along a substantially-vertical axis.

In the illustrated arrangement, the activator is configured to cammingly engage the striker.

In the illustrated arrangement, the striker is configured to cammingly engage the latch.

In the illustrated arrangement, when the latch comprises a pivotal latch dog, the striker is configured to cammingly engage the latch at a latch-engaging end of the striker, which is configured to be wedged between the latch dog and the barrier to open the latch.

In the illustrated arrangement, a latch-engaging end of the striker configured to cammingly engage the latch is ramped.

In the illustrated arrangement, the activator and striker are distinct from one another.

In the illustrated arrangement, the striker is movable independently of the activator.

In the illustrated arrangement, the striker has an enlarged end configured for gripping so that the latch is openable without actuating the activator.

In the illustrated arrangement, the striker is movable between a retracted position, in which the striker is arranged to be disengaged from the latch so that the latch is closed, and an extended position, in which the striker is arranged to engage the latch so that the latch is opened.

In the illustrated arrangement, the striker is biased to the retracted position by gravity.

In the illustrated arrangement, the striker is supported on the barrier by a mounting bracket configured to be attached thereto, and the striker forms a downwardly-facing ledge configured to engage an end of the mounting bracket to define the retracted position of the striker.

In the illustrated arrangement, the activator is movable, relative to the striker, between a retracted position, in which the activator is disengaged from the striker so that the latch is closed, and an extended position, in which the activator is engaged with the striker so that the latch is opened.

In the illustrated arrangement, the striker is arranged to be supported on a common side of the barrier as the latch and the activator is arranged to receive user-input on an opposite side of the barrier.

In the illustrated arrangement, the latch is distinct from the striker.

Preferably, the latch is a gravity latch having a latch dog which is biased to a closed position by gravity and pivotally movable therefrom to an open position.

Typically this type of latch is used with a swinging gate.

In the illustrated arrangement, the striker is supported on the barrier by a mounting bracket configured to be attached thereto, and the mounting bracket has an opening configured to receive the activator therethrough.

In the illustrated arrangement, the bracket is configured for coupling to a biasing element configured to bias the activator to a retracted position relative to the striker, in which the activator is disengaged from the striker.

BRIEF DESCRIPTION OF THE DRAWINGS

The invention will now be described in conjunction with the accompanying drawings in which:

FIG. 6 is an elevational view from one side of the system of FIG. 5;

FIG. 7 is an elevational view of a mounting bracket of a striker of the system, showing an opposite side to that visible in FIG. 6;

FIG. 8A is a plan view of an activator of the system of FIG. 5; and

FIG. 8B is an enlarged view of the area indicated at I in FIG. 8A, but rotated 90 degrees.

In the drawings like characters of reference indicate corresponding parts in the different figures.

DETAILED DESCRIPTION

Figure 4:
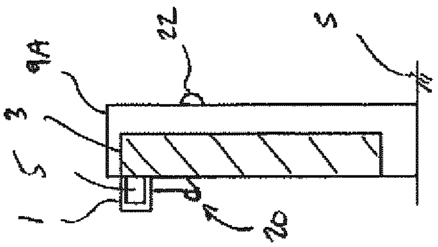
FIG. 4 is a cross-sectional view along line 4-4 in FIG. 1.
Figure 1:
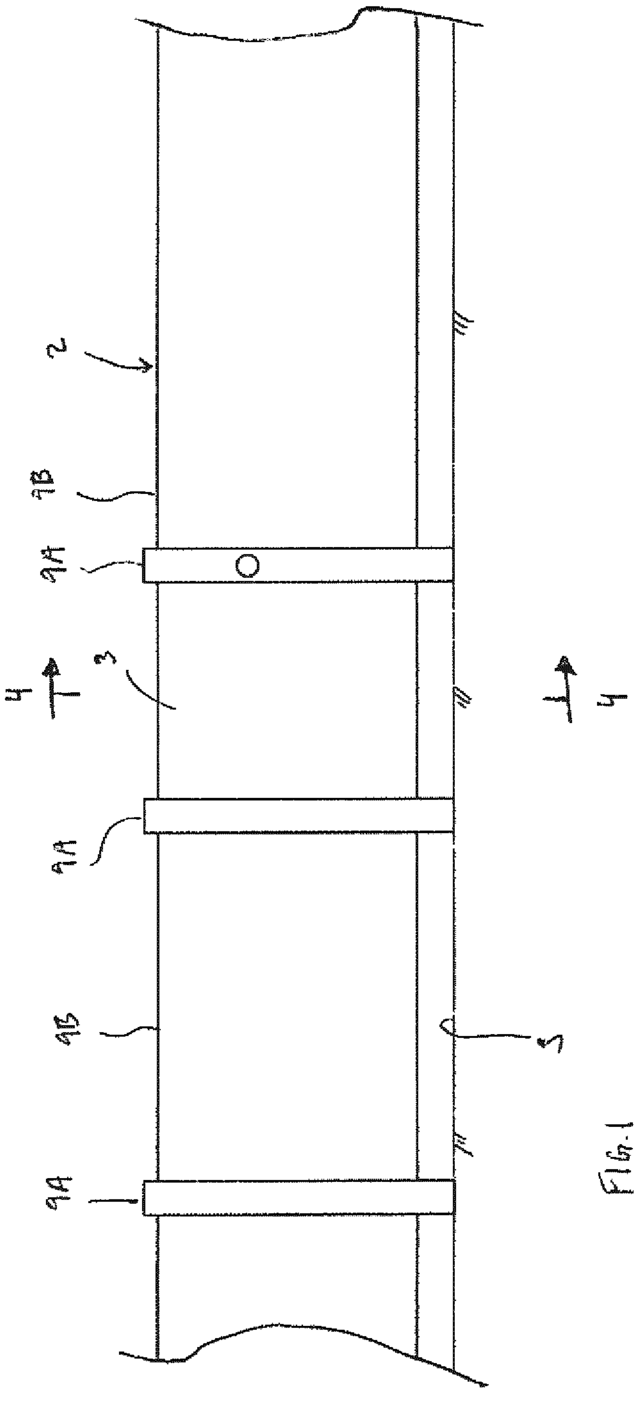
FIG. 1 is a schematic elevational view of a portion of a barrier with a gate.
Figure 2:
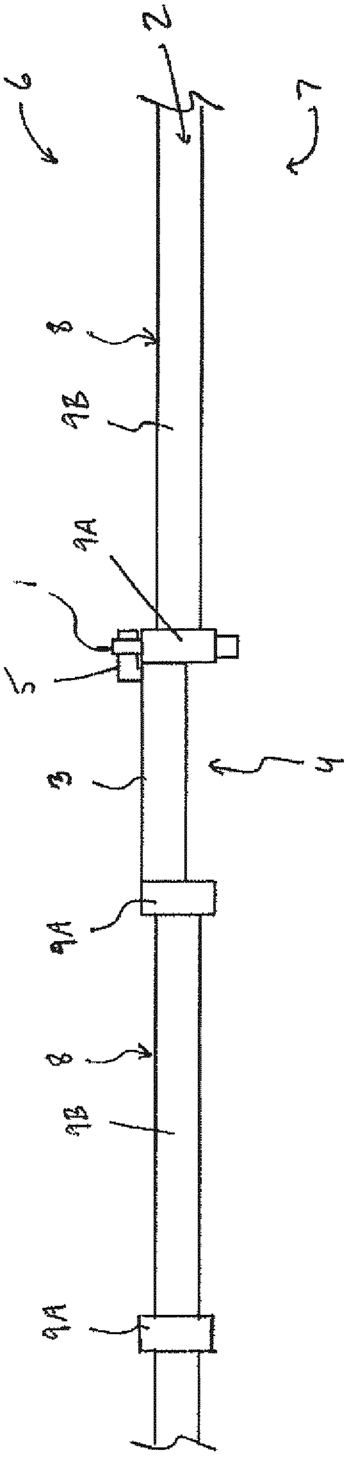
FIG. 2 is a schematic top plan view of the barrier of FIG. 1 with the gate shown in a closed position.
Figure 3:
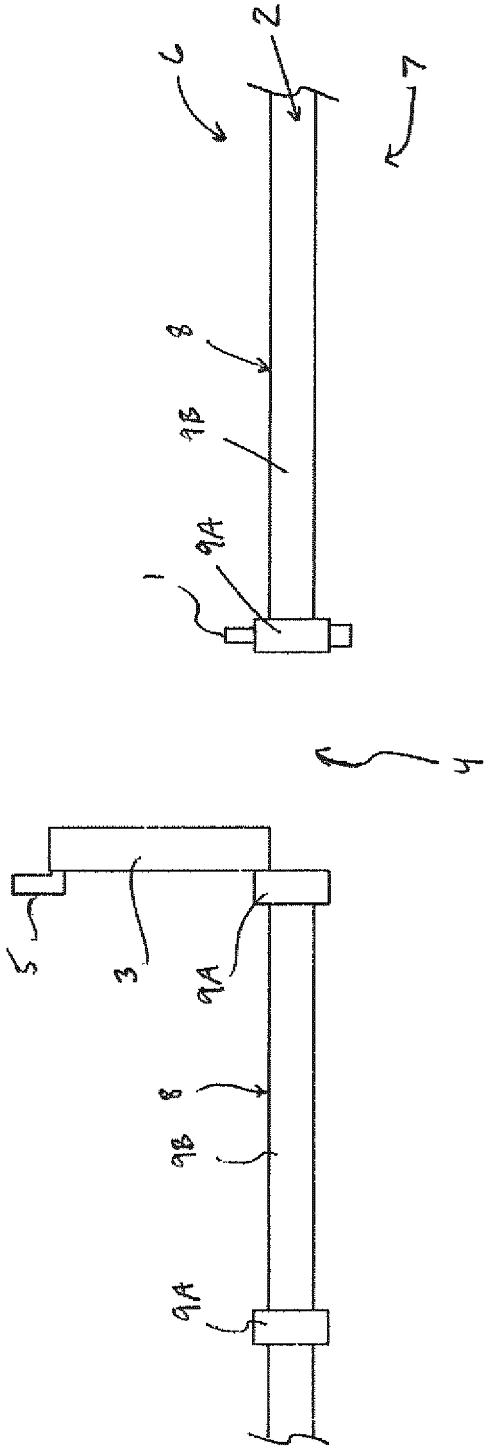
FIG. 3 is a schematic top plan view of the barrier of FIG. 1 with the gate shown in an open position.

With reference to the accompanying figures, there is shown a system 20 (FIG. 5) for opening a latch 1 on a barrier 2 such as a fence shown in FIGS. 1-4. The latch 1 is configured to selectively retain a gate 3, used to close a passageway 4 in or through the barrier. More specifically, the latch 1 is configured to cooperate with a keeper 5 on the gate 3, which is basically a protruding element typically in the form of a shaft, in order to selectively retain the gate 3 in a closed position (FIG. 2) in which the passageway 4 is obstructed thereby, and the barrier 2 is closed or uninterrupted for the purposes of separating an area on one side thereof, as indicated at 6, from an area on the opposite side of the barrier, as indicated at 7. In other words, the passageway 4 in the barrier is selectively unobstructed by the gate.

The latch 1 is typically supported on a stationary portion 8 of the barrier, which is fixed in location and position, and the gate 3 (defining a movable portion of the barrier) is movable relative thereto between the closed position and an open position (FIG. 3), in which the passageway 4 is substantially unobstructed to permit passage through the barrier 2 or in other words communication between opposite sides 6, 7 of the barrier. The stationary portion 8 of the barrier delimits the passageway selectively closed by the gate. According to conventional constructions, the stationary portion 8 typically comprises a plurality of upstanding posts 9A or support members embedded in or otherwise connected to or supported on ground material, and one or more panels 9B spanning between the posts 9A. The passageway 4 in the barrier is typically delimited by a pair of the upstanding posts 9A.

Figure 5:
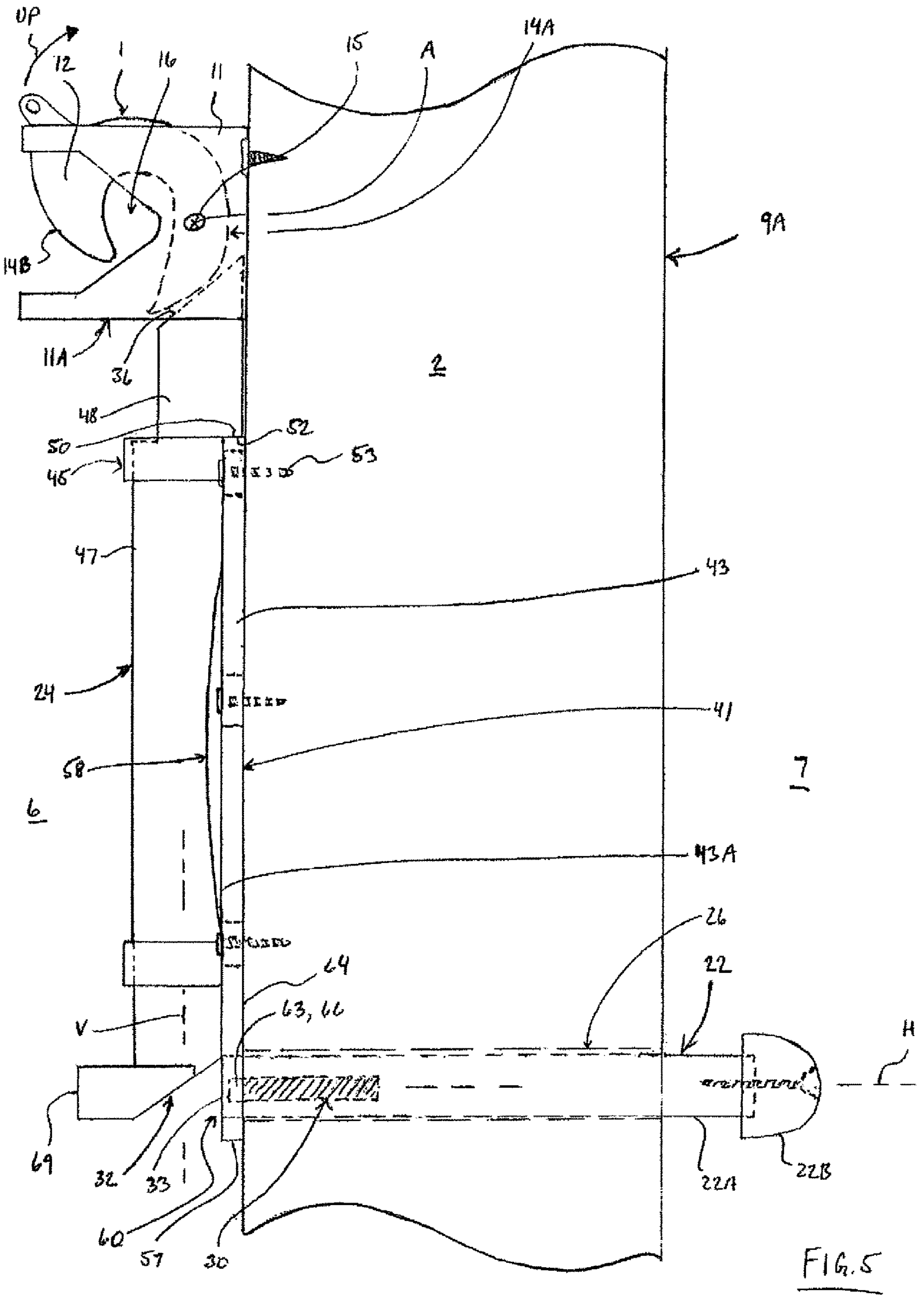
FIG. 5 is an elevational view of a system for opening a latch according to an arrangement of the present invention, shown on a barrier with a latch.

With reference to FIG. 5, the latch 1 generally comprises a housing 11 configured for mounting to the barrier 2 and a latch dog 12 carried on the latch housing 11 and configured for cooperating with the keeper 5 on the gate 3 to retain the gate in the closed position. The latch dog 12 is movable between a closed position, in which the dog 12 is arranged to obstructively engage the gate keeper 5 to retain the gate in the closed position, and an open position in which the dog 12 is arranged not to obstruct or prevent movement of the gate from the closed position to the open position, so that the gate keeper 5 is releasable from the latch.

In the illustrated arrangement, the latch 1 is a gravity latch such that the latch dog 12 is pivotally supported on the housing 11 for movement from the closed position, to which the dog 12 is biased by gravity, to the open position in upward pivotal movement as indicated by arrow UP. Most commonly, this type of latch is used with a barrier with a swinging type of gate, as shown in the illustrated arrangement, which is hingedly supported on the stationary portion 8 of the barrier for movement about a substantially vertical axis.

The latch dog 12 of the gravity latch is generally inverted J-shaped so as to have a downwardly extending leg portion 14A, locating a pivot axis A at pin 15, of the dog, and a hook portion 14B curving away from the leg portion 14A and downwardly to provide a receptacle 16 which is selectively accessible for receiving the gate keeper Access to the receptacle 16 is provided when the dog 12 is in the open position. The leg portion 14A is disposed adjacent the barrier so that the receptacle opens away from the barrier 2. The pivot axis A is substantially horizontal to provide for gravity-biasing to the closed position. An outer surface 17 of the dog 12 is arcuate so that the keeper can by camming engagement displace the dog 12 to the open position for subsequent receipt and retention in the receptacle 16.

Typically, the latch 1 is mounted on one side of the barrier, in this case on the side indicated at 6, and at a prescribed height above a ground surface S so as not to be easily accessible to an individual on either side of the barrier 2, especially on an opposite side to the latch (in this case indicated at 7), wanting to open the latch 1 to release the keeper 5. For example, the latch 1 is mounted on the post 9A of the stationary portion 8 of the barrier at a height coinciding or registering with a top of the gate 3 which is the highest mounting location of the keeper 5 on the gate 3, which in turn is at or adjacent a top of the post 9A which is generally at least 6 feet tall. This is intended to deter unauthorized entry through the passageway 4 of the barrier; however, it inadvertently impedes access to authorized individuals from an exposed side 7 of the barrier to a secure side 6 thereof.

To provide more convenient entry from the side of the barrier 2 opposite the latch 1, the system 20 comprises an activator 22, which is configured for receiving user-input, that is arranged at a different height on the barrier 2 than the latch 1, usually at a lower height so as to be closer to the ground surface S, and a striker 24 configured for selectively engaging the latch 1 responsive to the activator 22, so as to open the latch. The striker 24 is arranged to be supported on a common side of the barrier as the latch 1, in this case that indicated at 6, and the activator 22 is arranged to receive user-input on an opposite side of the barrier, in this case indicated at 7.

In the illustrated arrangement, the activator 22 is a mechanical actuator in the form of a plunger displaceable along a substantially horizontal axis H. The activator 22 is supported for movement along a passageway 26 in the barrier 2, in this case formed in the post 9A. The post passageway 26 is sized and shaped to snugly receive the activator 22 for axial movement therealong.

The plunger 22 comprises a shaft 22A configured to span at least a thickness of the passageway 26 in the post 9A and an enlarged button 22B on one end of the shaft which is arranged for abutting an outer surface of the post to unidirectionally limit movement of the activator through the passageway 26. The button 22B is arranged on the opposite side 7 of the barrier to the latch 1.

Turning now to the striker 24, in the illustrated arrangement this is also a mechanical actuator but displaceable along a substantially-vertical axis V. The striker axis of movement V is oriented transversely to the activator axis of movement H so that the activator 22 is arranged to interact with the striker 24, as will be described in further detail shortly. The striker 24 is arranged to span a height between the activator 22 and the latch 1.

In order to open the latch 1, the activator 22 is configured to cammingly engage the striker 24 which is configured to cammingly engage the latch 1. Thus the activator 22 and the striker 24 are distinct from one another and from the latch 1, and the striker 24 is movable independently of the activator. The activator 22 is arranged at a fixed prescribed height relative to the ground surface S while the striker 24 is arranged at a fixed location relative to the axis H of the activator.

To provide camming engagement with the striker 24, the activator 22 is movable relative thereto between a retracted position in which the activator is disengaged from the striker 24 so that the latch 1 is closed, that is the latch dog is in the closed position, and an extended position in which the activator 22 is engaged with the striker 24 so that the latch is opened. In the illustrated arrangement, the activator 22 is biased to the retracted position by a biasing element in the form of a compression spring 30. The spring 30 is embedded in the shaft by receipt in a channel 31 formed in the shaft and open at the free end of the shaft 22A. In movement of the activator to the extended position, by depressing the button 22B, the spring 30 is compressed, and upon release of the button 22B the activator 22 is automatically returned to the retracted position.

Since the striker is oriented for movement about an upstanding axis V, a lower end 32 of the striker is configured for camming input from a free end 33 of the activator which is positionable adjacent the lower striker end 32 on the same side of the barrier 2. The lower end 32 is ramped linearly downwardly and away from the barrier so that displacement of the free end 33 of the plunger activator 22 towards the axis of the striker 24 acts to gradually lift the striker upwardly and towards the latch 1. Linear ramping of a surface on the striker 24 opposite to the free activator end 33 means that displacement of the activator along its respective axis H is linearly proportional to displacement of the striker 24 along its respective axis V. A surface of the free end 33 of the activator is perpendicular to the axis A so that an upper edge at the free end 33 effects camming engagement with the striker 24.

The striker 24 is arranged below the latch 1 and the axis of striker movement V is arranged perpendicular to the pivot axis A of the latch dog. Since gravity biasing on the latch dog is most effective when the dog axis A is substantially horizontal, the striker 24 is arranged substantially vertically in-line with the latch 1. In turn, the activator 22 is substantially horizontally in-line with the striker 24 for camming engagement therewith.

In order to cammingly engage the latch 1, the striker has an upper latch-engaging end 36 configured to be wedged between the latch dog 12 and the barrier 2 to open the latch. More specifically, the latch housing 11 forms a cavity in which the latch dog 12 is pivotally supported, and this cavity is open on an underside 11A of the housing. Thus the latch-engaging end 36 is sized and shaped to fit into the cavity of the housing 11, and this end 36 is ramped linearly upwardly and toward the barrier 2 to form a tip 38 which, in vertically upward movement, fits in between a backside of the dog leg portion 14A and a proximal side of the barrier 6. The point of camming contact between the upper end 36 of the striker and the latch dog is between the dog pivot axis A and the barrier 2, so as to be opposite to the hook portion 14B, and a downwardly facing surface of the latch dog is curved downwardly and away from the barrier, so that vertically upward movement of the striker acts to pivot the hook portion 14B upwardly in the direction of arrow UP.

The striker 24 is movable, relative to the latch 1, between a retracted position, in which the striker 24 is arranged to be disengaged from the latch so that the latch is closed, and an extended position, in which the striker is arranged to engage the latch so that the latch is opened. Since the axis of movement of the striker is substantially vertical, the striker 24 is biased to the retracted position by gravity and is urged to the extended position by camming contact with the activator effected by displacement of the activator along its respective axis. Movement of the latch dog from the closed position to the open position, that is opening thereof, is gradual as the striker 24 is displaced upwardly.

In order to move between retracted and extended positions, the striker 24 is supported for sliding movement on a mounting bracket 41 configured to be attached to the barrier 2, such that the striker 24 is supported thereon. The bracket 41 comprises a substantially planar base portion 43 to provide a planar surface 43A for sliding contact with the striker 24. A plurality of ears 45 defining apertures are arranged on the base portion 43 to define a path of movement of the striker between the retracted and extended positions. The striker 24 comprises a first support portion 47 configured for mating with the bracket 41, that is by being sized and shaped to be snugly received in the ears 45, and an upper engagement portion 48 defining the latch-engaging end. Both portions 47, 48 extend linearly but the upper portion 48 is offset towards the barrier 2 so that the striker forms a downwardly-facing ledge 50 configured to engage an upper end 52 of the mounting bracket 41 to define the retracted position of the striker.

The mounting bracket 41 is fastened to the barrier 2 by a plurality of fasteners 53 at spaced locations, some of which are located generally centrally intermediate a height of the bracket 41 between the upper end 52 and a lower end 57 of the bracket. The support portion 47 of the striker 24 comprises a central cut-out 58 adjacent the bracket 41 so as to reduce a surface area of the striker in contact with the base portion 43 of the bracket, which may reduce friction or resistance to sliding movement of the striker.

In addition to supporting the striker for movement to engage the latch, the mounting bracket 41 has an opening 60 configured to receive the activator 22 therethrough. This opening 60, which is located generally at the lower end 57 of the base portion 43 of the bracket, is sized and shaped to correspond to a (maximum) cross-section of the activator 22 which in the illustrated arrangement is uniform along its full length. Thus, by location of the striker mounting bracket 41 on the barrier 2, an installer is enabled to accurately locate, for subsequent formation, the passageway 26 in the barrier for the activator 22.

Further, the bracket 41 comprises at least one recess 63 adjacent the opening 60 on a backside 64 of the bracket, which engages the barrier 2, configured for coupling with the biasing element 30 so that the biasing element is fixedly connected at one to provide biasing action against movement of the activator 22 to which it is connected at its opposite end. In the illustrated arrangement, there are a pair of recesses at diametrically opposite locations around the opening 60 which receive a retainer pin 66 fixedly coupled in transverse orientation to the spring 30.

Since the striker 24 is independently movable of the activator 22, there is provided a gripping portion 69 at or adjacent the lower end 32, which is enlarged relative to a remainder of the support portion 47 which defines the lower end 32, which is configured for gripping so that the latch is openable without actuating the activator. The enlarged end 59 also limits a range of movement of the striker 24. This provides an activation point for releasing the latch 1 at a lower height than same but also on the same side of the barrier as the latch. Thus the system has double-sided operation relative to the barrier 2.

The system 20 is suited for retrofitting an existing, conventional gravity latch to relocate an activation point, that is, a location relative to the latch 1 or barrier 2 where the latch is actuated to be opened to release the keeper 5 to a different height, usually a lower height, than the latch. Furthermore, implementation of the system 20 for use with the existing latch does not necessitate any modification thereto, so that the latch maintains its conventional functionality, including any ability to apply a lock to secure the latch in the closed position, and the latch can be operated independently of the system 20.

The system 20 is provided to the user, for installation and use, in essentially two components: a striker assembly comprising the striker 24 slidably mounted in the bracket 41, and activator biasing assembly comprising the activator and a biasing assembly including the biasing element 30 and the retainer pin 66 acting as a coupler. For installation purposes, the activator 22, which in the illustrated arrangement has an enlarged button 22B on the end thereof distal to the striker 24, is provided as separate button 22B and shaft 22A, with the latter preassembled with the biasing assembly. The striker assembly can be provided as a unitary assembly when formed by 3D printing.

Initially, the mounting bracket 41 with substantially-permanently connected striker 24 is positioned on the barrier 2 relative to the bracket to provide suitable camming contact for opening the latch 1. Generally speaking, the striker assembly is located immediately beneath the latch 1 so that an axis of striker movement V is vertically in-line with the latch. Since in the illustrated arrangement the striker is linearly elongated along this axis, alignment with the latch is convenient, based on visual vertical alignment with the striker 24.

Based on the mounting location of the striker assembly, the activator opening 60 can be used as a stencil for locating the activator 22 on the barrier, since the opening 60 registers or coincides with a passageway 26, which is basically a bore hole, to be formed in the barrier between opposite sides 6, 7.

Once the bore 26 is drilled, the activator shaft 22A with attached biasing assembly is positioned in the bore, and the button 22B is attached on the opposite end protruding through the opposite side 7 of the barrier.

In use, an end of the activator 22 exposed on the side of the barrier opposite to the latch, that is that at 7, and located in spaced relation from the barrier is depressed by a user or, generally speaking, provided user input. This causes, on the opposite side of the barrier at 6, camming engagement with the lower end 32 of the striker 24, which acts to lift the striker from its retracted position into camming engagement with the latch dog 12. The upward movement of the striker 24 effects opening of the latch 1, so that the gate keeper 5 can be released.

As described hereinbefore the present invention relates generally to a system for opening a latch on a barrier comprises an activator configured for receiving user-input, which is arranged at a different height on the barrier than the latch, and a striker configured for selectively engaging the latch responsive to the activator, so as to open the latch. Preferably, the activator and striker are distinct, linearly displaceable members, which are distinct from the latch and interact by camming engagement in a series configuration. Since the striker is independently movable of the activator, the activator can be bypassed for operating the system on the same side as the latch.

The scope of the claims should not be limited by the preferred embodiments set forth in the examples but should be given the broadest interpretation consistent with the specification as a whole.

The invention claimed is:

1. A latch system for mounting on a barrier for latching the barrier in a closed position, the latch system comprising:

a latch defining a receptacle for a horizontal latch pin to hold the horizontal latch pin in the receptacle and the barrier in the closed position, the latch being pivotal about an axis parallel to the horizontal latch pin to move to an open position and release the horizontal latch pin from the receptacle for opening the barrier;

an elongate striker bar configured for selectively engaging the latch so as to move the latch to the open position of the latch to release the horizontal latch pin;

the elongate striker bar being mounted for movement in a vertical direction;

the elongate striker bar having a cam surface on the elongate striker bar for engaging a cooperating surface on the latch to move the latch to the open position;

the cam surface of the elongate striker bar being separate from the cooperating surface of the latch to allow the latch to move away from the cam surface of the elongate striker bar to move to the open position independently of movement of the elongate striker bar;

a planar mounting plate for supporting the striker, the planar mounting plate being arranged to be mounted on a flat surface of the barrier on a same side of the barrier as the latch at a position spaced vertically from the latch;

the planar mounting plate including upper and lower guide elements thereon for guiding said movement of the elongate striker bar in the vertical direction;

a manually operable elongate activator bar arranged for manual pushing movement of the elongate activator bar in a horizontal direction at right angles to the planar mounting plate in a direction toward the elongate striker bar;

the elongate activator bar having a cam surface on the elongate activator bar for engaging a cooperating surface on the elongate striker bar to move the elongate striker bar to move the latch to the open position;

the cam surface on the elongate activator bar being separate from the cooperating surface of the elongate striker bar to allow the elongate striker bar to move away from the cam surface on the elongate activator bar to move independently of movement of the elongate striker bar;

a manually operable handle on the elongate striker bar for manual movement of the elongate striker bar independently of movement of the elongate activator bar;

whereby the activator is arranged at a different height on the barrier than the latch.

2. A latch system for mounting on a barrier for latching the barrier in a closed position, the latch system comprising:

a latch defining a receptacle for a horizontal latch pin to hold the horizontal latch pin in the receptacle and the barrier in the closed position, the latch being pivotal about an axis parallel to the horizontal latch pin to move to an open position and release the horizontal latch pin from the receptacle for opening the barrier;

an elongate striker bar configured for selectively engaging the latch so as to move the latch to the open position of the latch to release the horizontal latch pin;

the elongate striker bar being mounted for movement in a vertical direction;

the elongate striker bar having a cam surface on the elongate striker bar for engaging a cooperating surface on the latch to move the latch to the open position;

the cam surface of the elongate striker bar being separate from the cooperating surface of the latch to allow the latch to move away from the cam surface of the elongate striker bar to move to the open position independently of movement of the elongate striker bar;

a planar mounting plate for supporting the striker, the planar mounting plate being arranged to be mounted on a flat surface of the barrier on a same side of the barrier as the latch at a position spaced vertically from the latch;

the planar mounting plate including upper and lower guide elements thereon for guiding said movement of the elongate striker bar in the vertical direction;

a manually operable elongate activator bar arranged for manual pushing movement of the elongate activator bar in a horizontal direction at right angles to the planar mounting plate in a direction toward the elongate striker bar;

the planar mounting plate having an opening therein through which the elongate activator bar passes;

the elongate activator bar having a cam surface on the elongate activator bar for engaging a cooperating surface on the elongate striker bar to move the elongate striker bar to move the latch to the open position;

the cam surface on the elongate activator bar being separate from the cooperating surface of the elongate striker bar to allow the elongate striker bar to move away from the cam surface on the elongate activator bar to move independently of movement of the elongate striker bar;

a manually operable handle on the elongate striker bar for manual movement of the elongate striker bar independently of movement of the elongate activator bar;

whereby the activator is arranged at a different height on the barrier than the latch.

* * * * *